Figures 1, 2:
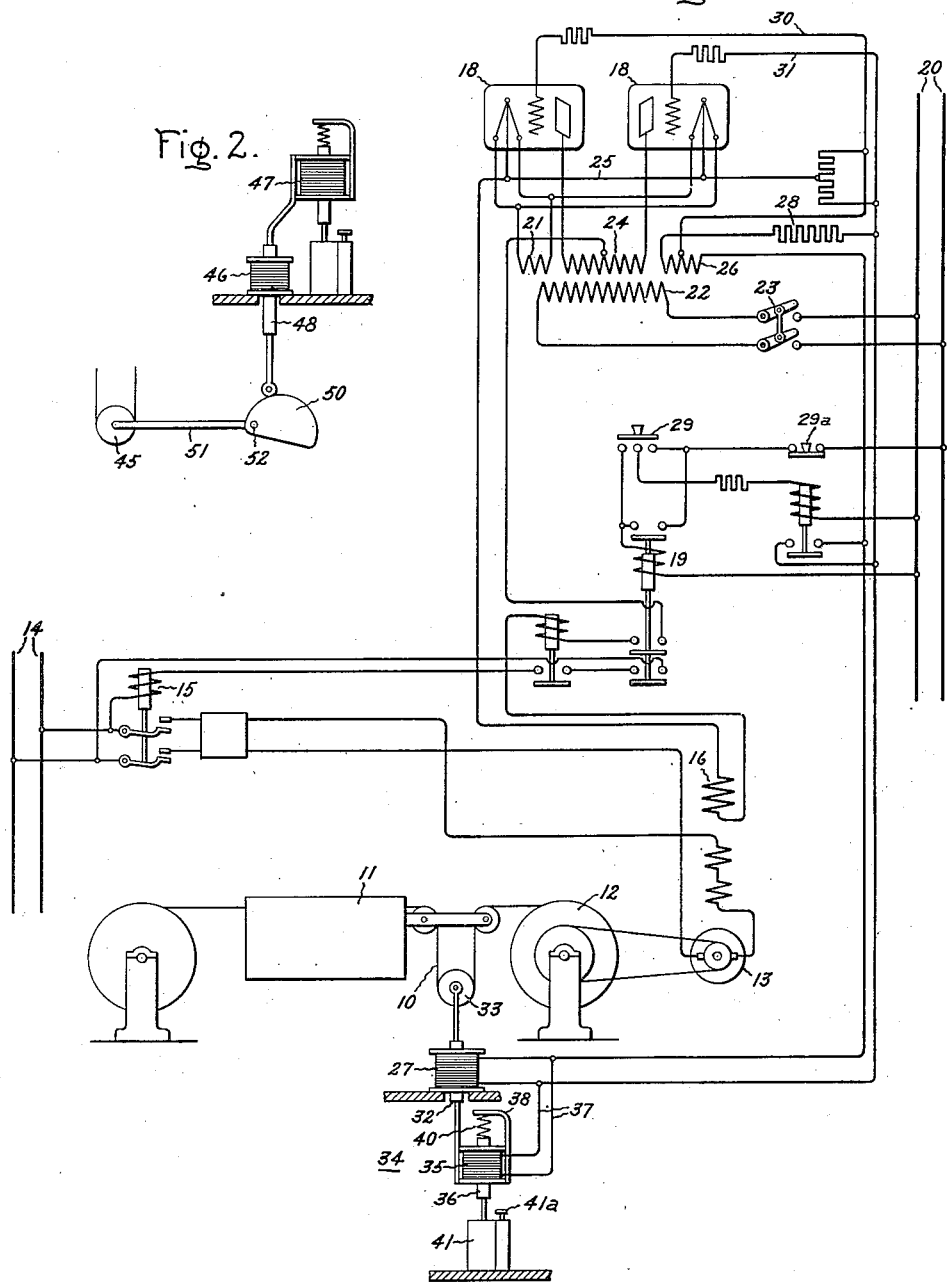

July 10, 1934.   H. L. PALMER   1,966,214
CONTROL SYSTEM
Filed Jan. 6, 1933

Inventor:
Harry L. Palmer,
by Charles E. Mullan
His Attorney.

Patented July 10, 1934

1,966,214

UNITED STATES PATENT OFFICE 1,966,214

CONTROL SYSTEM

Harry L. Palmer, Scotia, N. Y., assignor to General Electric Company, a corporation of New York Application January 6, 1933, Serial No. 650,428

13 Claims. (Cl. 242—45)

This invention relates to control systems, more particularly to systems for controlling apparatus performing an operation on a length of material, and it has for an object the provision of an improved system of this character.

More specifically, the invention relates to motor-driven winding and reeling apparatus in which the speed of the reel is varied in accordance with changes in the diameter of the reeled material and a specific object of this invention is the elimination of undesirable oscillations or "hunting" in the operation of the system.

In carrying the invention into effect in one form thereof, means responsive to a variation in the tension of the material being operated upon or responsive to a variation in the length of a loop formed in the material are provided for changing the speed of the apparatus driving means to a new value, and additional means actuated by the speed changing means and acting cumulatively therewith to increase the rate of the speed change are provided together with means for rendering the rate increasing means ineffective as the speed of the driving means approaches the new value.

In illustrating the invention in one form thereof, it is shown as embodied in a system for controlling the speed of apparatus for reeling wire delivered from a wire drawing machine.

For a better and more complete understanding of the invention reference should now be had to the following specification and to the accompanying drawing in which Fig. 1 is a simple diagrammatical representation of an embodiment of the invention, and Fig. 2 is a diagrammatical representation of a modification embodying an improvement.

Referring now to the drawing, a length of material, such for example as the wire 10 delivered from a wire drawing machine 11, has a loop formed therein as illustrated and is wound upon a roll by reeling apparatus 12. The reel is driven by any suitable power translating device such for example as the electric motor 13, the drive shaft of which is belted to the reel. Although the motor 13 may be of any suitable type it is illustrated as a direct current motor, the armature of which is supplied from any suitable source of direct current voltage, represented by the two supply lines 14, to which the armature is connected by means of a suitable line switch 15. As shown, the motor 13 is provided with a separately excited field winding 16 which is supplied with direct current of variable magnitude by any suitable means such for example as represented by the electric valve apparatus comprising a pair of electric valves 18 which in turn are supplied from a suitable source of alternating voltage represented by the two supply lines 20. The operation of line switch 15 is under the control of a relay 19, the operation of which in turn is under the control of suitable starting and stopping switches 29 and 29a, respectively, of any suitable form, but preferably manually operated push button type switches as illustrated.

Although the electric valves 18 may be of any suitable type, they are preferably of the three-electrode type into the envelopes of which a small quantity of an inert gas, such for example as mercury vapor, is introduced after exhaust; the presence of the mercury vapor within the valves serving to convert the usual electron discharge into an arc stream and thus constituting the valves electrostatically or grid controlled arc rectifiers.

The cathodes of the electric valves 18 are heated by energy supplied from the secondary windings 21 of a supply transformer, the terminals of the primary winding 22 of which are connected to the supply line 20 when the switching device 23 is operated to its closed position. Alternating voltage is supplied to the anodes of the electric valve apparatus 18 from the secondary winding 24 of the supply transformer to the opposite terminals of which secondary winding the anodes are connected as illustrated.

The separately excited field winding 16 of the driving motor is connected in the output circuit of the electric valve apparatus, that is to say one terminal of the field winding is connected to a conductor 25 which as illustrated is connected to the mid-point of the cathodes and the opposite terminal of the field winding is connected to the mid-point of the secondary winding 24 of the anode supply. As thus connected the electric valve apparatus rectifies both half waves of the alternating voltage and supplies a continuous direct current to the field winding 16. It is well understood that if an alternating voltage is applied to the grid of electric valve apparatus of this type and the phase relationship between the grid and anode voltages varied, the magnitude of the current flowing in the output circuit will be correspondingly varied. When the grid voltages is substantially in phase with the anode voltage, maximum current flows in the output circuit and when the grid voltage is 180° out of phase with the anode voltage substantially no current flows in the output circuit. For intermediate phase relationships, the current flowing in the output circuit has corresponding intermediate values. For the purpose of controlling the current flowing in the output circuit and consequently for controlling the speed of the electric motor 13, alternating voltage is supplied to the grids of the electric valve apparatus 18 from the secondary winding 26 of the supply transformer and a variable reactance device 27 is connected in the grid circuit for the purpose of varying the phase relationship between the grid and anode voltages. Although any suitable form of phase shifting circuit may be employed, the arrangement illustrated in the drawing is desirable from the point of view of simplicity and inexpensiveness. As shown, this circuit comprises a resistance member 28 and the coil of the solenoid 27 connected in series relationship with each other across the terminals of the secondary winding 26 and the grid of one of the valves is connected by means of a conductor 30 to the mid-point of the secondary winding 26; whilst the grid of the other electric valve is connected to the point at which the resistance 28 and the coil of the solenoid 27 are connected together by means of the conductor 31.

The solenoid 27 is provided with a cooperating core member 32 arranged for movement within the solenoid and connected to a pulley 33 supported in the loop of the wire 10. By varying the position of the core 32 within the solenoid 27, the reactance of the latter is varied, which in turn causes a variation in the power factor of the grid circuit and consequently a variation in the phase relationship between the grid and anode voltages.

As the diameter of the roll of wire on the reel 12 increases the length of the loop formed in the wire 10 decreases thereby raising the core member 32, the result of which is to advance the phase of the grid voltage with respect to the anode voltage and to increase the current supplied by the electric valves 18 to the separately excited field winding 16. This increase in the current supplied to the field winding of the motor 13 results in decreasing the speed of the motor thereby compensating for the increase in the diameter of the roll. It will thus be seen that for every position of the core 32 relative to the solenoid 27, there is a corresponding speed of the motor 13.

The system as described thus far, is the same as described and claimed in U. S. Patent 1,844,699, George E. Stack, dated Feb. 9, 1932 and assigned to the assignee of the present invention. This system, although entirely operative, leaves something to be desired with respect to the eliminating of hunting or oscillation in its compensating action. Some factors giving rise to the hunting condition are the large inertias of the motor armature and of the reel apparatus 12, the inductive time lag in the various controlling circuits and especially the time lag and magnetization curve of the motor field. The hunting action may be briefly described as follows:

As the diameter of the roll increases at the beginning of a layer, the loop in the wire 10 is shortened thereby raising the core 32. As previously stated, this change in the position of the core exercises a controlling action on the grids of the electric valves 18 and finally increases the current flowing in the field winding 16 and correspondingly decreases the speed of the motor 13. Due to the time lag resulting from the above enumerated factors, the speed of the motor 13 is not decreased as rapidly as the core 32 moves to its new position with the result that when the core is at the position corresponding to the correct speed at this point in the operation the motor speed has not yet reached this value. Consequently, the length of the loop is still further decreased and the core 32 rises to a still higher position, the corresponding motor speed of which position, under stable conditions of operation, is less than the correct motor speed. Consequently, when the motor speed finally attains the correct value the solenoid core is in a position demanding a still further decrease in the motor speed which accordingly tends to decrease to a value corresponding with the position of the solenoid core at this instant. As a result of this decrease in speed the length of the loop starts to increase and the core 32 to descend. During this period, the motor speed is still decreasing which it continues to do until after the core 32 has descended to a position calling for an increase in speed. Thus, it is seen that during unstable or transient conditions the speed of the motor 13 always lags the position of the core 32 resulting in a hunting or oscillating condition that is undesirable.

In order to eliminate this unstable hunting condition, anti-hunting means 34 are provided. As illustrated the anti-hunting means comprises a second solenoid 35 provided with a relatively movable core member 36. The solenoid 35 is connected by means of conductors 37 in parallel with the solenoid 27 and the grid circuit of the electric valve apparatus. The coil 35 is mounted on a frame that is attached by means of the connecting rod 38 and the movable core 32 so as to move therewith. The bracket 38 is attached to the solenoid supporting frame and a resilient connecting means illustrated as a spring 40 serves to connect the core 36 with the bracket 38. A suitable damping means shown as an oil dash-pot 41 serves to dampen and retard any movement of the core 36 and the degree of this dampening is adjusted as desired by means of the adjustment screw 41a. Thus it will be seen that a movement of the core 32 of the main solenoid effects a relative movement between the solenoid 35 and the core 36 and that the spring 40 acts to restore the initial relative positions of the solenoid 35 and core 36 at a rate that is dependent upon the setting of the dashpot 41. A change in the relative position of the solenoid 35 and its core 36 acts cumulatively with the solenoid 27 to effect a change in the speed of the motor 13 and thus increases the rate at which such a change is made.

In operation, when an increase in the diameter of the roll due to the beginning of the formation of a new layer shortens the length of the loop, the rider pulley 33 and the core 32 attached thereto is moved upwardly responsively to the shortening loop. This upward movement of the core 32 effects a change in its position relative to the solenoid 27 and likewise results in advancing the phase of the grid voltages of the electric valve apparatus relative to the anode voltages thereby finally resulting in an increase in the current supplied to the field winding 16 and a decrease in the speed of the motor 13. Simultaneously, the solenoid 35 is moved upwardly, and since the upward motion of the core 36 is retarded by the dashpot 41, there is a resulting relative movement between the solenoid 35 and the core 36 which produces a controlling action on grids of the electric valve apparatus that acts cumulatively with that produced by the solenoid 27. The electrical and mechanical constants of the anti-hunting means 34 are so designed that the resulting increased rate of change of motor speed insures that the actual instantaneous speed of the motor 13 corresponds accurately with the position of the core 32. As the speed of the motor 13 approaches the correct value, i. e., the value necessary to compensate for the increased diameter of the roll, the loop in the wire 10 no longer changes in length and the core 32 comes to rest. Likewise the solenoid 35 ceases its upward movement and the spring 40, which has been placed under tension by the upward movement of the solenoid acts to restore the core 36 to its original position within the solenoid 35. The upward movement of the core 36 is damped by the dashpot 41 by an amount that can be adjusted as desired so that as the motor speed attains the correct value, the solenoid 35 and core 36 are again in their original relative positions and the anti-hunting means 34 is thus rendered inactive.

In the modification of Fig. 2, only the structure of the speed changing means is illustrated. This structure is similar to that of Fig. 1 but the arrangement is slightly different. In the modified form, the dancer roll 45 supported in a loop of wire corresponds to the dancer roll 33 of Fig. 1 and the solenoids 46 and 47 correspond respectively to the solenoids 27 and 35 of Fig. 1.

It is well understood that regulation of a characteristic of a dynamo electric machine by field control is not uniform for different magnitudes of the regulated characteristics. This is due to the fact that when the magnetic structure approaches saturation a change in the amount of current flowing in the field winding does not result in as great a change in the regulated characteristic as does a corresponding change in the amount of current at low flux densities of the magnetic structure. As applied to the system under consideration, a change in the length of the loop does not result in as great a change in the motor speed when the field pieces are highly saturated as does the same change in the length of the loop at low flux densities of the field structure. Consequently, the regulating action of the system of Fig. 1 is more sensitive at high motor speeds than at low motor speeds.

For the purpose of maintaining substantially uniform sensitivity of the regulating action regardless of the actual speed at which the motor is operating, means are provided in the modified form of Fig. 2 for varying the amount of movement of the core 48 resulting from a predetermined amount of change in the length of the loop in accordance with the actual motor speed. This means is illustrated as a cam member 50 included in the connections between the dancer roll 45 and the core member 48. The dancer roll 45 is rotatably mounted upon a swinging lever 51 pivoted for rotation about the point 52. The cam 50 is fixedly mounted upon the lever 51 for rotation therewith about the fulcrum point 52. As the dancer roll 45 rises in response to a shortening loop the lever 51 swings in a clockwise direction about the fulcrum point 52 and consequently changes the point on the cam surface at which the core member 48 makes contact therewith. The cam surface is so shaped and designed that at low motor speeds i. e. with the dancer roll in its uppermost range of movement a predetermined change in the length of the loop results in a relatively large movement of the core 48 and conversely at high motor speeds, the same predetermined amount of change in the length of the loop results in a greatly diminished movement of the core 48. The effect of this is to provide a substantially straight line relationship, i. e., a constant ratio between the change in the length of the loop and a change in the motor speed at all motor operating speeds between the highest and lowest values in the range through which the motor operates.

Although in accordance with the provisions of the patent statutes, this invention is described as embodied in concrete form it will be understood that the apparatus and connections shown are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States, is:

1. In combination with apparatus for performing an operation on a length of moving material, driving means for said apparatus, means comprising a pair of inductively related members having relative movement in response to a variation in the tension of said material for controlling said driving means to restore the original tension, and anti-hunting means actuated by said tension responsive means and acting cumulatively therewith during relative movement of said members and becoming inactive when said relative movement ceases for controlling said apparatus.

2. In combination with apparatus for performing an operation on a length of moving material, driving means for said apparatus, means re- means for temporarily increasing the rate of said material for varying the speed of said driving means to restore the normal tension, and anti-hunting means actuated by said speed varying means for temporarily increasing the rate of said speed variation only while said tension responsive means is active and for decreasing said rate as the tension approaches its normal value.

3. In a control system for apparatus performing an operation on a length of moving material forming a loop, driving means for said apparatus, means controlled by a change in the length of said loop for effecting a variation in the speed of said driving means and means actuated by said loop controlled means for acting cumulatively with said loop controlled means to increase the rate of said speed change during the initial stage thereof and becoming inactive as the speed of said driving means approaches the final value.

4. A control system for apparatus performing an operation on a length of moving material forming a loop, driving means for said apparatus, means responsive to a change in the length of said loop for effecting a change in the speed of said driving means, and means actuated by said loop responsive means for increasing the rate of said speed change only while said loop responsive means is effecting a speed change and for becoming inactive as the speed of said driving means approaches the correct value.

5. A control system for apparatus for reeling a length of material to form a roll, an electric motor for driving the reel, means responsive to a change in the diameter of said roll for effecting a permanent change in the speed of said motor, means actuated by said last mentioned means for acting cumulatively therewith to increase the rate of said speed change and becoming inactive when the speed of said motor approaches the correct value.

6. A control system for apparatus for reeling a length of material to form a roll, an electric motor for driving said roll, means controlled by said material for decreasing the speed of said motor to a new value in response to an increase in the diameter of said roll, and means actuated by said material controlled means for increasing the rate of said speed change only while said material controlled means is effecting a speed reduction and becoming inactive as the speed of said motor approaches said new value.

7. In combination with a translating device, control means for said device, a solenoid connected to said control means and provided with a core, means for effecting relative movement between said members to vary an operating condition of said device, and anti-hunting means comprising a second solenoid connected to said control means and provided with a core and means responsive to said relative movement for effecting relative movement between said second solenoid and its core.

8. In combination with a translating device, control means for said device, a pair of members comprising a solenoid connected to said control means and a cooperating core, means responsive to an operating characteristic of said device for effecting relative movement between said pair of members to effect a change in an operating condition of said device, and anti-hunting means comprising a second solenoid member connected to said control means and provided with a cooperating core member, a mechanical connection between one of said last members and one of said first pair of members providing relative movement of said second members, and means providing return of said second members to their original relative positions upon termination of said change.

9. In combination, an electric motor, means for controlling the speed of said motor, a solenoid connected to said speed control means and provided with a movable core, means for effecting a movement of said core to effect a change in the speed of said motor to a new value, means for controlling the rate of said change comprising a second solenoid connected to said speed controlling means and provided with a core, a mechanical connection between said movable core and said second solenoid for effecting a movement of said second solenoid relative to its core while said movable core is in motion, and means for rendering said second solenoid inactive as the speed of said motor approaches said new value comprising a resilient connection between said second solenoid and its core for restoring their original relative positions.

10. In combination an electric motor, means for controlling the speed of said motor, a pair of cooperating members comprising a core and a solenoid connected to said speed controlling means, means for effecting a relative movement of said members for changing the speed of said motor to a new value, and anti-hunting means comprising a second solenoid member connected to said controlling means and a cooperating core member, a mechanical connection between one of each of said pairs of members for effecting relative movement between said second pair of members in response to relative movement of said first pair, a resilient connection between said second solenoid and its core for restoring their original relative positions, and means for controlling the rate of return of said second solenoid and core to said positions.

11. In combination with an electric motor, speed control means for said motor comprising electric valve apparatus connected in circuit with said motor and provided with a control grid, a pair of members comprising a solenoid connected to said grid, and a cooperating core member, means for effecting relative movement of said members to change the speed of said motors to a new value and anti-hunting means comprising a second solenoid member connected to said grid, a core member cooperating therewith, a mechanical connection between one of each of said pairs of members providing relative movement of said last pair responsive to relative movement of said first pair for controlling the rate of said change of speed, and means for restoring said second solenoid and core to their original positions as the speed of said motor approaches said new value.

12. A control system for apparatus for reeling a length of material to form a roll, means providing a loop in said length, a motor for driving the reel, speed control means for said motor, a pair of cooperating members comprising a core and a solenoid connected to said speed control means, means for changing the speed of said motor to a new value to compensate a change in the diameter of said roll comprising a device supported in said loop and movable in response to a change in the length thereof and a mechanical connection between said device and one of said members for effecting relative movement of said members and means controlled by the speed of said motor for varying the sensitivity of said speed changing means in accordance with the speed of said motor.

13. A control system for apparatus for reeling a length of material to form a roll, means providing a loop in said material, an electric motor for driving the roll, speed control means for said motor, a solenoid member connected to said speed control means, a cooperating core member, means for effecting a change in the speed of said motor to compensate a change in the diameter of said roll comprising a device supported in said loop and movable in response to a change in the length thereof and a connection between said device and one of said members for effecting relative movement thereof, and means providing a substantially constant ratio between an amount of movement of said device and the resulting speed change at all speeds of said motor comprising means included in said connection for varying the amount of said relative movement responsively to a movement of said device in dependence on the speed of said motor.

HARRY L. PALMER.

CERTIFICATE OF CORRECTION.

Patent No. 1,966,214.  July 10, 1934.

HARRY L. PALMER.

It is hereby certified that error appears in the printed specification of the above numbered patent requiring correction as follows: Page 1, lines 104-105, for "voltages" read voltage; page 3, line 110, claim 2, for "means for temporarily increasing the rate" read sponsive to a variation in the tension; and that the said Letters Patent should be read with these corrections therein that the same may conform to the record of the case in the Patent Office.

Signed and sealed this 7th day of August, A D. 1934.

Leslie Frazer (Seal)  Acting Commissioner of Patents.